United States Patent [19]

Block et al.

[11] Patent Number: 4,771,022
[45] Date of Patent: Sep. 13, 1988

[54] HIGH PRESSURE PROCESS FOR PRODUCING TRANSFORMATION TOUGHENED CERAMICS

[75] Inventors: Stanley Block, Silver Spring, Md.; Gasper J. Piermarini, McLean, Va.

[73] Assignee: The United States of America as represented by the Secretary of Commerce, Washington, D.C.

[21] Appl. No.: 15,577

[22] Filed: Feb. 18, 1987

Related U.S. Application Data

[63] Continuation of Ser. No. 832,935, Feb. 26, 1986, abandoned.

[51] Int. Cl.$^4$ .............................................. C04B 35/48
[52] U.S. Cl. ........................................ 501/103; 501/1; 501/87; 501/96; 501/105; 501/151; 264/65
[58] Field of Search ................... 423/608; 501/96, 103, 501/104, 105, 1, 87, 151; 264/65

[56] References Cited

U.S. PATENT DOCUMENTS

| 4,279,655 | 7/1981 | Garvie et al. | 264/65 X |
| 4,333,986 | 6/1982 | Tsuji et al. | 423/446 X |
| 4,349,636 | 9/1982 | Vahldiek | 501/96 X |
| 4,377,565 | 3/1983 | Setaka | 423/446 X |
| 4,506,024 | 3/1985 | Claussen et al. | 501/105 X |

FOREIGN PATENT DOCUMENTS

| 0043379 | 11/1980 | Japan | 423/608 |
| 0285579 | 10/1970 | U.S.S.R. | 501/103 |

OTHER PUBLICATIONS

CA 74(22):6664u, Weir et al., "Compressability of Inorganic Oxides", 1971.

CA 103(20):170176z, Syssan, "Pressure Induced Structural Transition in Strontium Sulfide", 1985.
Stevens, "An Introduction to Zirconia", Magnesium Elektron Ltd., Jun. 1983.
Kulcinski, G. L., "High-Pressure Induced Phase Transition in $ZrO_2$", Journal of American Ceramic Society, vol. 51, No. 10, Oct. 1968.
daJornada, J. A. H., et al., "Phase Transition and Compression of $LiNbO_3$ Under Static High Pressure," Journal of Applied Physics, vol. 57, No. 3, Feb. 1, 1985, 842–844.
Block, S., et al., "Pressure-Temperature Phase Diagram of Zirconia," Journal of the American Ceramic Society, vol. 68, No. 9, Sep. 1985, 497–499.

Primary Examiner—William R. Dixon, Jr.
Assistant Examiner—Karl Group
Attorney, Agent, or Firm—Thomas Zack; Alvin Englert; Albert Tockman

[57] ABSTRACT

Toughening agents are produced by the application of high pressure, sufficient to transform a powder material into a denser high pressure polymorph. When the pressure is released, the high pressure phase is retrieved metastably at ambient conditions of pressure and temperature. The amount of high pressure phase retained at ambient conditions depends on the relative hydrostaticity of the pressurized environment and particle size of the powder. The high pressure phase is almost completely retained in a hydrostatic environment. One embodiment of the process of the present invention produces pressure transformation toughened zirconia comprising a high pressure phase having a symmetry no greater than tetragonal (defined as tetragonal II) dispersed within a matrix of a less dense monoclinic phase.

6 Claims, 2 Drawing Sheets

HIGH PRESSURE PROCESS FOR PRODUCING TRANSFORMATION TOUGHENED CERAMICS

BACKGROUND OF THE INVENTION

1. Field of the Invention

This application is a continuation of application Ser. No. 832,935, filed Feb. 26, 1986, now abandoned.

The present invention relates to a composition of transformation toughening agents and transformation toughened ceramics. The present invention also relates to a high pressure process for preparing transformation toughening agents and transformation toughened ceramics.

2. Discussion of the Prior Art

Transformation toughening, a relatively recent development, is responsible for a significant improvement in the mechanical properties of ceramic materials. Although ceramics are generally known for their high temperature strength, heat resistance and high temperature thermal insulation characteristics, they are also known as being extremely brittle. Transformation toughening results in ceramics which are more resistant to crack propagation.

Two criteria are necessary for transformation toughening a ceramic material. First, a metastable phase must be uniformly dispersed in a matrix of the ceramic material to be toughened. The metastable phase must be denser than the stable phase to which it will transform or must have at least one crystallographic cell dimension less than any one of those of the stable phase. This condition produces either a molar volume increase or at least one larger cell dimension on transformation to the stable phase. Second, the transformation from metastable to stable must be as rapid as a diffusionless or martensitic-type transition, however any similarly rapid transformation is adequate. In general, toughened materials meeting these criteria have been obtained by thermal treatments (temperature toughening) at elevated temperature and generally at or near ambient pressure to obtain the necessary stable/metastable phase. The occurrence of this type of phase is very limited and, at present, is known to occur primarily in zirconia and its isomorph hafnia.

Thermal treatment produces only a few toughening agents because, heat transformed materials normally expand to form a less dense phase. In contrast, transformation toughening requires forming a dense metastable phase dispersed in a stable matrix. For zirconia, the tetragonal phase, which occurs at high temperature, is denser than the monoclinic phase, which occurs at ambient conditions, thus zirconia can be temperature toughened. Having the dense metastable phase dispersed within a matrix of a ceramic material results in toughening, because cracks resulting from the shocks hit the clusters of metastable crystals within the matrix, and transform the metastable crystals to the form stable at ambient conditions of pressure and temperature. This transformation absorbs energy and stops further cracking. In the case of zirconia, the toughening is achieved by the rapid transformation of the metastable high temperature tetragonal phase to the less dense stable monoclinic phase.

Prior attempts of temperature transformation toughening include U.S. Pat. No. 4,279,655 to Garvie et al. This reference teaches producing a magnesia partially stabilized zirconia material which has a low silica content and a microstructure which comprises matrix grains of cubic stabilized zircinia, each grain being about 70 micrometers in diameter and containing within a uniform distribution of very fine microcrystalline monoclinic zirconia particles which have been formed by the controlled thermal transformation of tetragonal precipitates of zirconia. The tetragonal precipitates formed within the matrix grains which have not been thermally transformed into microcrystalline monoclinic zirconia also impart toughness to the material, because they are transofmred mechanically by a moving crack.

Thermal transformation toughening only applies to a few crystalline materials, as discussed above. It would be desirable to have a process which could transform a wide variety of crystalline ceramic materials to have a metastable phase uniformly dispersed in a desired ceramic matrix.

SUMMARY OF THE INVENTION

In the present invention, process transformation toughening agents are produced by the application of high pressure, which is sufficient to transform the original material into a denser high pressure polymorph. The application of pressure can occur at room temperature or at elevated temperature, depending on the material. On release of pressure, the high pressure phase is retrieved metastably at ambient conditions of pressure and temperature. The amount of high pressure phase retained depends on the material treated, the relative hydrostaticity of the pressurized environment, the residence time, pressure and temperature of preparation and the particle size of the powder. For zirconia, for example, essentially complete retention of the high pressure metastable phase is achieved in a hydrostatic environment with appropriate temperature seasoning. The particle sizes range over a particle size distribution wherein the average particle size is at most about 1 micron.

For zirconia, the high pressure metastable phase has a symmetry no higher than tetragonal and is hereafter defined as the tetragonal II phase. The stable phase is the monoclinic phase. The high pressure tetragonal II phase differs from a tetragonal I phase produced by high temperature. The differences between the tetragonal I and tetragonal II phases are discussed in "Pressure-Temperature Phase Diagram of Zirconia", S. Block, J. A. H. da Jornada, and G. J. Piermarini, *Journal of the American Ceramics Society*, Vol. 68, No. 9, 497–499, 1985, which is incorporated herein by reference.

Accordingly, it is an object of the present invention to provide a process for toughening a ceramic material by applying pressure to the ceramic material to convert a stable phase of the material to a metastable phase of the material.

Another object of the present invention is to provide a process for pressure transformation toughening a crystalline material to have a high pressure phase of the material that can be retained metastably at ambient conditions and can transform rapidly.

Another object of the present invention is to provide a process for pressure transformation toughening a crystalline material selected from the group consisting of zirconia, hafnia, metal oxides other than zirconia and hafnia, metal sulfides, metal silicates, leucite, pyroxenes, substituted fluorites, oxyfluorides, carbides, borides and nitrides.

Another object of the present invention is to provide a ceramic material comprising the metastable high pressure phase of a crystalline material at ambient pressure and temperature conditions.

Another object of the present invention is to provide a ceramic composition comprising the tetragonal II phase of zirconia.

Another object of the present invention is to provide a ceramic composition comprising a crystalline material having the structure of a member of the group consisting of zirconia, hafnia, metal oxides other than zirconia and hafnia, metal sulfides, metal silicates, leucite, pyroxenes, substituted fluorites, oxyfluorides, carbides, borides and nitrides, wherein the crystalline material comprises a high pressure metastable phase within a ceramic matrix.

The transformation toughening process may occur by pressurizing a stable phase of a crystalline material to a pressure sufficient for converting a portion of the stable phase to a metastable phase. For example, the pressure for zirconia ($ZrO_2$) is at least 3.3 GPa, for leucite ($KAlSi_2O_6$) at least 2.3 GPa, and for $RbAlSi_2O_6$ at least 1.8 GPa. Pressurization results in producing the metastable transformation toughening agent. During pressurization, the material is sintered at a non-conventional, relatively low temperature, in the case of zirconia, preferably at most 500° C.

Another process for producing transformation toughened product is to pressurize powdered stable phase crystalline material to transform it to the metastable high pressure phase. Then, retrieve the metastable phase at ambient conditions and mix the prepared powdered metastable high pressure phase in appropriate proportions with matrix materials to be toughened. The mixture of matrix and metastable phases is then sintered by conventional or non-conventional processes to produce the toughened product.

DESCRIPTION OF THE PREFERRED EMBODIMENTS

In the present invention transformation toughening agents are produced by the application of high pressure. This high pressure is sufficient to transform the original material into a denser high pressure polymorph. The application of pressure can be done at room temperature or at elevated temperatures, depending on the material. On release of pressure, the high pressure phase is retrieved metastably at ambient conditions of pressure and temperature. The amount of high pressure phase retained depends on the material transformed, the relative hydrostaticity of the pressurized environment, the residence time, pressure and temperature of preparation, and particle size of the powder.

Figure 1:
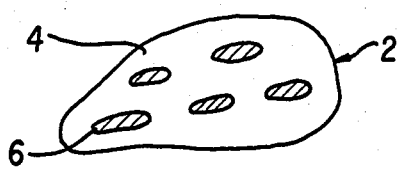
FIG. 1 is a schematic drawing of the microstructure of the pressure transformation toughened material comprising metastable phase material dispersed within a matrix of stable phase material.

As shown in FIG. 1, the ceramic composition 2 of the present invention can comprise a metastable phase 6 dispersed within a matrix of a ceramic compound 4.

The metastable phase 6 transforms to a less dense stable phase upon a stress such as a moving crack. This transformation reduces the cracktip stress intensity and prevents further propagation of cracking. The matrix 4 and metastable dispersed material 6 may be two phases of the same compound. For example, the matrix 4 may be a stable monoclinic phase of zirconia and the dispersed material 6 may be a metastable tetragonal II phase of zirconia. The matrix 4 and the dispersed material 6 may also be different compounds. For example, the matrix 4 may be alumina, or combinations of alumina and the stable phase of zirconia, and the dispersed material 6 may be the metastable tetragonal II phase of zirconia. The important criteria is that the dispersed material 6 comprise a metastable phase which transforms under stress to a stable phase which is less dense than the stable phase.

Figure 2:
FIG. 2 is a pressure toughened material comprising metastable phase material.

As shown in FIG. 2, the ceramic composition of the present invention can comprise the metastable phase 10.

Figure 3:
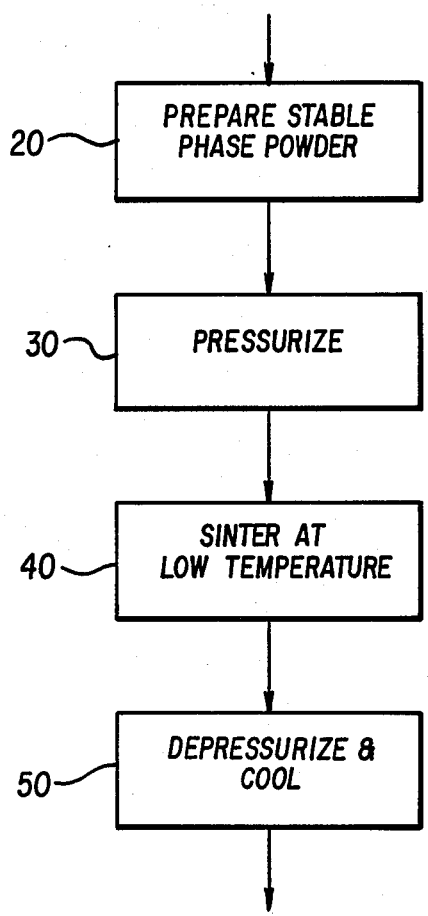
FIG. 3 is a flowchart for a first process for pressure transformation toughening a ceramic material.

In a first embodiment of the process of the present invention, shown by FIG. 3, the high pressure transformation toughened product is prepared as follows. Prepare a stable phase powder by step 20. The powder has an average particle size of at most about 1 micron. Then, pressurize the stable phase material by step 30 to convert the material to a mixture of metastable-stable polymorphs. Then, sinter the mixture by a sintering step 40. Then, depressurize and cool the mixture by step 50 to ambient temperature. The above process occurs under the appropriate conditions of conversion pressure (hydrostatic or non-hydrostatic) and sintering temperature. The high pressure phase is only partially reconverted to the stable phase when the product is returned to ambient pressure and temperature conditions. The pressure and temperature depend on the particular material used. In the case of zirconia the sintering occurs at a temperature of at most 500° C., and the pressurization 30 occurs at a pressure of at least 3.3 GPa and for at least 1 hour.

The above procedure produces a form of the material which has the necessary stable-metastable mixture of phases and the appropriate net shape of the product. Furthermore, highly temperature-dependent properties, such as grain growth, void populations, dislocations and inclusions, all factors which may adversely affect the toughness, are controlled and thus minimized in high pressure processes carried out at relatively low sintering temperatures.

Figure 4:
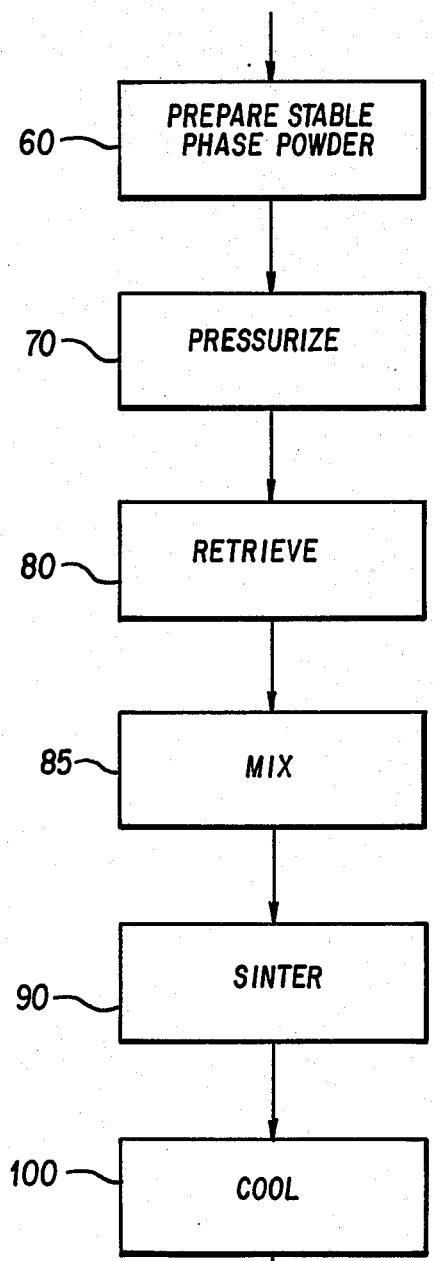
FIG. 4 is a second process for pressure transformation toughening a ceramic material.

In a second embodiment of the process of the present invention, the prepared powdered metastable high pressure phase material is mixed in appropriate proportions with other powdered materials to be toughened. The powdered materials have an average particle size of at most about 1 micron. The mixture of stable and metastable phases is then sintered by conventional or non-conventional processes to produce the toughened product. As shown by FIG. 4, in the second embodiment, the transformation toughening agent is prepared by preparing a stable phase powder in step 60. The ceramic powder is pressurized in step 70 sufficiently to induce a high pressure phase transformation to convert the stable phase powder to metastable powder, which is the transformation toughening agent. The pressurization step 70 includes the application of pressure (usually, but not necessarily, hydrostatic pressure) and temperature. The exact values for pressure and temperature will depend on the particular ceramic powder employed. The pressure is at least 3.3 GPa, for zirconia. The metastable phase is then retrieved by step 80 at ambient conditions of pressure and temperature. The retrieval step 80 may involve a quenching process that incorporates dopants in the sample and controls temperature and hydrostatic environments. The exact procedure will depend on the particular material used. The metastable high pressure phase is then mixed by conventional mixing procedures in step 85 with other stable ceramic powders to form the required metastable-stable mixture of phases necessary for transformation toughening. Then, the mixture undergoes a sintering step 90 at conventional sintering conditions and is then cooled by step 100 to produce the transformation toughened product.

The second embodiment has the advantage that it mixes small amounts of powder of the pressure transformation toughened agent with matrix powder. This facilitates production of large objects because the entire object need not be subjected to high pressure.

The concept and method of transformation toughening described above has been demonstrated with the ceramic, zirconia. The pressure-temperature phase diagram of pure zirconia has been studied and disclosed by "Pressure-Temperature Phased Diagram of Zirconia", S. Block, J. da Jornada and G. J. Piermarinia, *Journal of the American Ceramic Society*, Vol. 68, 497 (1985). This journal article discusses the crystallographic identification and physical characterization, i.e., density, rapidity of transformation, determination of transformation pressure and its hysteresis processes and delineation of the pressure-temperature stability field, of a tetragonal II form of zirconia. The article distinguishes the high pressure tetragonal II form of zirconia from the high temperature tetragonal I form of zirconia. Table 1 provides an X-ray diffraction pattern for tetragonal II phase zirconia produced at 8.3 GPa.

TABLE 1

Observed and Calculated Interplanar Spacings for $T-ZrO_2$ (II) at 8.3 GPa

| $d_{obs}$ (nm) | $d_{calc}$ (nm) | hkl | $d_{obs}$ (nm) | $d_{calc}$ (nm) | hkl |
|---|---|---|---|---|---|
| 0.51* | | 100 | 0.1769 | 0.1771 | 220 |
| 0.3608 | 0.3620 | 101 | 0.1700 | 0.1702 | 212 |
| 0.2934 | 0.2934 | 111 | 0.1648 | 0.1649 | 103 |
| 0.2612 | 0.2619 | 002 | 0.1568 | 0.1566 | 113 |
| 0.2510 | 0.2505 | 200 | 0.1520 | 0.1516 | 311 |
| 0.2324 | 0.2321 | 102 | 0.1468 | 0.1467 | 222 |
| 0.2047 | 0.2060 | 211 | 0.1399 | 0.1408, 0.1389 | 302, 320 |
| 0.1811 | 0.1810 | 202 | | | |

*2 = 4° for this reflection

The high pressure tetragonal II phase is not the high temperature tetragonal I phase, but another related to it by having less symmetry than P4/nmc and an a-axis of $2^{\frac{1}{2}}a$ of the high-temperature form. This can be seen from the powder pattern of Table 1, because a forbidden (100) line at 0.51 nm occurs, as well as 2 lines at 0.1702 nm (212) and 0.1649 nm (103), while only one line at 0.1687 nm is allowed in the high-temperature tetragonal I form.

In the present invention, the high pressure tetragonal II form (phase) can be produced at pressures above the 3.3 GPa transformation pressure, and temperatures below 500° C., and subsequently retrieved, either totally or partially, at 1 atmosphere and room temperature.

Table 2 provides the X-ray diffraction pattern for the high pressure metastable phase of hafnia (HfO_2) produced at 6.9 GPa. Similarly to the case of zirconia, the high pressure metastable phase of hafnia differs from the high temperature metastable phase of hafnia.

TABLE 2

Observed and Calculated Interplanar Spacings For The High Pressure Form of Hafnia ($HfO_2$) at 6.9 GPa

| $d_{obs}$ (nm) | $d_{calc}$ (nm) | hkl |
|---|---|---|
| 0.3595 | 0.3604 | 101 |
| 0.2919 | 0.2922 | 111 |
| 0.2607 | 0.2604 | 002 |
| 0.2499 | 0.2496 | 200 |
| 0.2309 | 0.2309 | 102 |
| 0.2052 | 0.2052 | 211 |
| 0.1803 | 0.1802 | 202 |
| 0.1766 | 0.1765 | 220 |
| 0.1693 | 0.1695 | 212 |
| 0.1640 | 0.1640 | 103 |
| 0.1558 | 0.1558 | 113 |

The following examples illustrate the preparation and composition of pressure transformation toughened zirconia. Sintered zirconia powder compacts have been prepared, from powders having an average particle size of about 1 micron, under varying conditions of pressure, sintering temperature and sintering time to demonstrate the significance of the concept of pressure transformation toughening. The retrieved powder compacts were evaluated for hardness and toughness by a microindentation test method commonly used and accepted for such physical properties determinations.

EXAMPLE 1

The powdered ceramic material (or mixture of materials) prior to immediate use should be of sufficiently small size and relatively free of adsorbed water, residual organic components and other impurities. Generally, heating to temperature of approximately 150° C. is sufficient to drive off adsorbed water. In the case of zirconia powder, which can have adsorbed chloride, the heating is done for a period of 4 hours at 400° C. The preheated powder is loaded into a pressure device, such as a press, or, in the present example, a diamond anvil high pressure cell. Sufficient pressure was applied to the powder to produce a transformation to a high pressure phase. The exact value of the applied pressure required to induce the transition to the high pressure phase will depend on the particular ceramic powder used. In the present example, which employed zirconia, Table 3 illustrates the pressures, temperatures and times employed.

The compacted powder at elevated pressure was then heated to temperatures of at most 500° C. These temperatures are well below conventional sintering temperatures. The compacted powder was held at that temperature for a period of time sufficient to properly sinter the material. Sintering times of up to 4 hours were used. As with pressure, the exact sintering temperature and sintering time will depend on the specific ceramic powder employed.

After sintering at the above given pressure, temperature and sintering time, the pressure was released to one atmosphere within a few seconds and the system was then allowed to cool unassisted to room temperature.

The compact, containing the metastable high pressure phase uniformly dispersed in a stable phase matrix, was removed from the pressure device, yielding directly the transformation toughened product.

Figure 5:
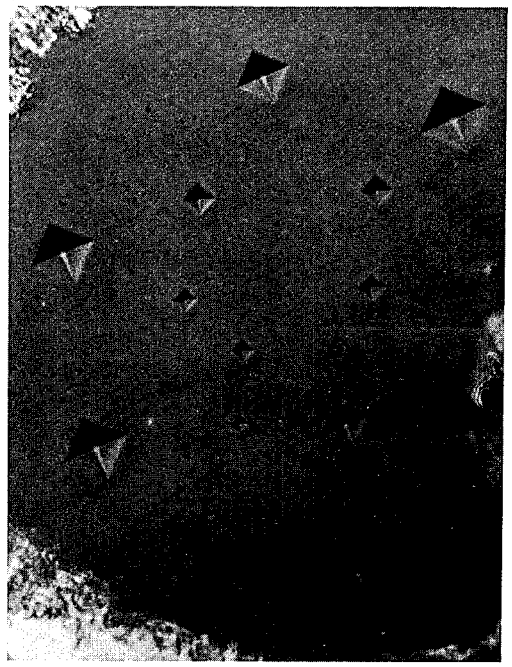
FIG. 5 is a picture of indentations on high pressure transformation toughened zirconia compact.

The results of Example 1 are tabulated in Table 3, labeled micro-indentation tests on retrieved powdered zirconia compacts. The compacts containing no high pressure tetragonal II phase are poorly compacted materials with ill-defined properties of hardness and toughness. On the other hand, zirconia compacts containing both the ordinary monoclinic form and the high pressure tetragonal II form, i.e., compacts which meet the necessary stable-metastable mixture requirement, exhibit appreciable hardness, which are comparable to conventionally (thermally) transformation-toughened zirconia ceramics. As shown by FIG. 5, these transformation toughened materials showed no significant or measurable cracking in the region of the sharp corners of the indentation, indicating superior toughness properties. FIG. 5 is a photomicrograph of the surface of the zirconia compact made at the conditions of 8.6 GPa, 250° C., 1.5 hour of Table 3. The range of hardnesses obtained for pressure transformation toughened zirconia, of 10.3–16.9 GPa, is comparable to values obtained for conventionally (temperature) hardened zirconia.

TABLE 3

Micro-Indentation Tests on Retrieved $ZrO_2$ Powder Compacts

| Pressure | Sintering, Temp., °C. | Time Hr | Hardness GPa $ZrO_2$ | Toughness MPa/$m^2$ | Vol. % High Pressure Form |
|---|---|---|---|---|---|
| 3.5 | 20 | 0.5 | ID | ID | 0 |
| 7.6 | 20 | 0.5 | ID | ID | 0 |
| 3.2 | 150 | 0.5 | ID | ID | 0 |
| 5.0 | 250 | 0.5 | 4.4 | ID | 0 |
| 8.6 | 250 | 1.5 | 10.3 | NSC | 40 |
| 8.5 | 500 | 1.5 | 13.0 | NSC | 50 |
| 8.5 | 500 | 4.0 | 12.0–16.9 | NSC 4.4 | 60 |

NSC = No Significant Cracks
ID = Ill-defined Indentation - Poorly Compacted Material

EXAMPLE 2

Figure 6:
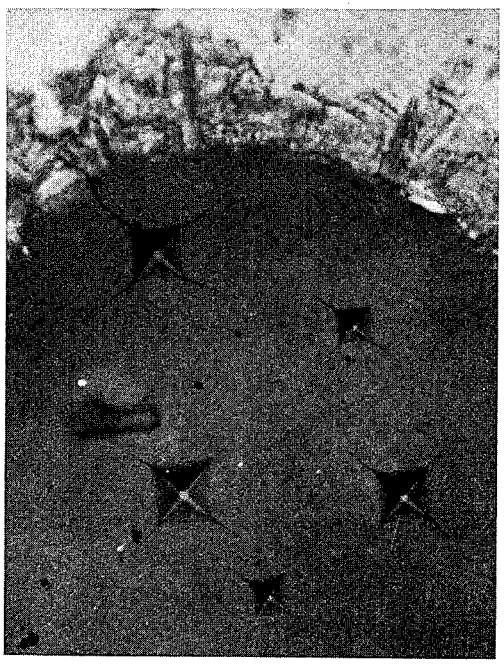
FIG. 6 is a picture of indentations on an 88 wt % zirconium oxide, 12 wt % yttrium oxide compact.

Table 4 shows the results for cubic-stabilized yttria doped zirconia calculated from micro-indentation tests. FIG. 6 shows the indentations on a sample sintered at 250° C. and listed in Table 4. As seen in FIG. 6, all indentations show directional cracks emanating from the sharp corners. The toughness of this material is extremely poor. This material was chosen to resemble zirconia but not to have a high pressure metastable phase. Thus, a zirconia compact containing some high pressure metastable phase has superior toughness to a compact of 88 wt % zirconia ($ZrO_2$): 12 wt % yttria ($Y_2O_3$), which has no metastable retained phase.

TABLE 4

Micro-Indentation Tests on 88 wt % $ZrO_2$.12 Wt % $Y_2O_3$* Powder Compacts

| Pressure | Sintering Temp., °C. | Time Hr | Hardness GPa | Toughness MPa/$m^2$ | Phase |
|---|---|---|---|---|---|
| 8.6 | 250 | 1.5 | 8.9 | 0.6** | C |
| 8.5 | 500 | 4 | 10 | spall,poor | C |

C = Cubic, No Transformation
*Chosen to Resemble $ZrO_2$, but not to have a High Pressure Phase
**All Indentations Show Cracks The present invention has the advantage that pressure transformation toughening is applicable over a wide range of materials, including zirconia, hafnia, metal oxides other than zirconia and hafnia, metal sulfides, metal silicates, zeolite-type structures, such as leucite ($KAlSi_2O_6$), pyroxenes, substituted fluorites, oxyfluorides, carbides, borides and nitrides. In contrast, temperature transformation toughening is limited because, at present, it is known to occur primarily in zirconia and its isomorph hafnia. Furthermore, the high pressure metastable phases of zirconia and hafnia have different X-ray diffraction patterns than the respective high temperature metastable phases of zirconia and hafnia.

While specific embodiments of the method and apparatus aspects of the inventiin have been shown and described, it should be apparent that many modificatioons can be made thereto without departing from the spirit and scope of the invention. Accordingly, the invention is not limited by the foregoing description, but is only limited by the scope of the claims appended thereto.

What is claimed is:

1. A process for preparing a toughened ceramic selected from the group consisting of a metal oxide, a metal sulfide, a metal silicate, a fluorite, an oxyfluoride, a carbide, a boride or a nitride having a crystalline phase stable at ambient conditions and a crystalline phase metastable at ambient conditions, said metastable phase being denser than said stable phase, which comprises:
   (a) subjecting a powder of the said stable phase having a particle size of at most about one micron to a pressure of at least 1.8 GPa and sufficient to martensitically convert a portion of said stable phase to said metastable phase;
   (b) sintering the powder at a temperature less than 500° C. while maintaining the pressure to form a compact; and
   (c) reducing the pressure and cooling the compact to ambient condition.

2. The process of claim 1, wherein the metal oxide is zirconium oxide or hafnium oxide.

3. A process for preparing a toughened ceramic material which comprises:
   (a) subjecting a powder having a particle size of at most one micron of a material selected from the group consisting of a metal sulfide, a metal silicate, a fluorite, an oxyfluoride, a carbide, a boride or a nitride having a crystalline phase stable at ambient conditions and a crystalline phase metastable at ambient conditions, said metastable phase being denser than said stable phase, to a pressure of at least 1.8 GPa at a temperature less than 500° C., sufficient to martensitically convert a portion of the said stable phase to the said metastable phase;
   (b) mixing the powder containing the said stable and metastable phases with a powder of the ceramic material to be toughened; and
   (c) sintering the mixture of powders to form a compact, whereby said compact is tougher than a compact prepared under comparable conditions by sintering a powder consisting essentially of the ceramic material to be toughened.

4. The process of claim 1, wherein the metal oxide is a zirconium oxide or hafnium oxide.

5. A process for preparing a toughened zirconium oxide ceramic, which comprises:
   (a) subjecting a powder of monoclinic zirconium oxide having a particle size of at most about one micron at a temperature less than 500° C. to a pressure of at least 3.3 GPa to martensitically convert a portion of the monoclinic zirconium oxide to tetragonal II zirconium oxide;
   (b) heating the powder at a temperature less than 500° C., while maintaining the pressure, to form a sintered compact; and
   (c) reducing the pressure and cooling the sintered compact to ambient conditions.

6. A process for preparing a toughened ceramic material, which comprises
(a) subjecting a powder of monoclinic zirconium oxide having a particle size of at most about one micron at a temperature less than 500° C. to a pressure of at least 3.3 GPa to martensitically convert a portion of the monoclinic zirconium oxide to tetragonal II zirconium oxide;
(b) mixing the powder containing monoclinic zirconium oxide and tetragonal II zirconium oxide, with a powder of the ceramic material to be toughened; and
(c) sintering the mixture to form a compact, whereby said compact is tougher than a compact prepared under comparable conditions by sintering a powder consisting essentially of the ceramic material to be toughened.

* * * * *